(12) United States Patent
Uno et al.

(10) Patent No.: US 9,089,908 B2
(45) Date of Patent: Jul. 28, 2015

(54) TIP-REPLACEABLE CUTTING TOOL

(75) Inventors: Kazuyuki Uno, Iwaki (JP); Naoto Nishiya, Iwaki (JP)

(73) Assignee: Tungaloy Corpration, Iwaki-shi, Fukushima (JP)

(*) Notice: Subject to any disclaimer, the term of this patent is extended or adjusted under 35 U.S.C. 154(b) by 553 days.

(21) Appl. No.: 13/480,183

(22) Filed: May 24, 2012

(65) Prior Publication Data

US 2012/0230790 A1  Sep. 13, 2012

Related U.S. Application Data

(63) Continuation-in-part of application No. PCT/JP2010/071809, filed on Dec. 6, 2010.

(30) Foreign Application Priority Data

Dec. 8, 2009  (JP) ................................ 2009-278296

(51) Int. Cl.
*B23C 5/20* (2006.01)
*B23C 5/22* (2006.01)
*B23C 5/10* (2006.01)
*B23D 31/00* (2006.01)

(52) U.S. Cl.
CPC ............ *B23C 5/109* (2013.01); *B23C 5/2208* (2013.01); *B23D 31/003* (2013.01); *B23C 5/20* (2013.01); *B23C 2210/168* (2013.01); *B23C 2220/16* (2013.01); *Y10T 408/909* (2015.01)

(58) Field of Classification Search
CPC .................................... B23C 5/20; B23C 5/22
USPC .................... 407/40, 42, 33, 34, 48
See application file for complete search history.

(56) References Cited

U.S. PATENT DOCUMENTS

| | | | | |
|---|---|---|---|---|
| 4,283,163 A * | 8/1981 | Grafe et al. | ............ | 407/104 |
| 4,398,853 A * | 8/1983 | Erickson | ............ | 407/104 |
| 5,160,228 A * | 11/1992 | Arai et al. | ............ | 407/32 |
| 5,217,330 A * | 6/1993 | Dennstedt | ............ | 407/37 |
| 5,346,336 A * | 9/1994 | Rescigno | ............ | 407/104 |

(Continued)

FOREIGN PATENT DOCUMENTS

| | | | | |
|---|---|---|---|---|
| DE | 3642514 C1 * | 6/1988 | ........ | B23C 5/20 |
| EP | 1310311 A2 * | 5/2003 | ........ | B23B 27/16 |

(Continued)

OTHER PUBLICATIONS

International Preliminary Report on Patentability (IPRP) dated Jun. 12, 2012 issued in PCT counterpart application (No. PCT/JP2010/071809) with translation.

(Continued)

*Primary Examiner* — Sunil K Singh
*Assistant Examiner* — Ryan Rufo
(74) *Attorney, Agent, or Firm* — Womble Carlyle

(57) ABSTRACT

As viewed from a side opposing a bottom face (6) of an insert attachment seat, an angle ($\alpha$) between first and second restraint wall faces (7a) and (7b) rising from the bottom face (6) is smaller than an angle ($\beta$) between two peripheral faces of a cutting insert contacting them respectively. A first peripheral face of the cutting insert contacts the first restraint wall face (7a) in a substantially parallel posture with the extending direction of the first restraint wall face (7a), while the second peripheral face contacts the second restraint wall face (7b) in an end portion of the second restraint wall face (7b).

5 Claims, 8 Drawing Sheets

(56) References Cited

U.S. PATENT DOCUMENTS

| | | | |
|---|---|---|---|
| 5,443,334 A | 8/1995 | Pantzar | |
| 6,213,691 B1 | 4/2001 | Leeb | |
| 6,540,448 B2 * | 4/2003 | Johnson | 407/35 |
| 6,793,446 B2 | 9/2004 | Sjöö | |
| 7,296,953 B2 * | 11/2007 | Kuenzel | 408/83 |
| 7,597,507 B2 * | 10/2009 | Sakamoto et al. | 407/40 |
| 7,819,610 B2 | 10/2010 | Walström et al. | |
| 2005/0084342 A1 | 4/2005 | Festeau et al. | |
| 2008/0152441 A1 | 6/2008 | Andersson et al. | |

FOREIGN PATENT DOCUMENTS

| | | | |
|---|---|---|---|
| FR | 2094446 A5 | 2/1972 | |
| FR | 2651703 A1 | 3/1991 | |
| JP | S57-136615 | 8/1982 | |
| JP | S58-173422 | 11/1983 | |
| JP | H02-130704 | 10/1990 | |
| JP | 09-029514 A * | 2/1997 | B23B 27/16 |
| JP | 09-094705 A * | 4/1997 | B23B 27/16 |
| JP | 2002-066826 A | 3/2002 | |
| JP | 2005-028502 | 3/2005 | |
| JP | 2005-205527 A | 8/2005 | |
| JP | 2007-223020 | 9/2007 | |

OTHER PUBLICATIONS

Decision on Grant dated Jul. 17, 2013 issued in Russian counterpart application (No. 2012122764).
Extended Search Report dated May 14, 2013 issued in European counterpart application (No. 10835927.4).
Search Report dated Feb. 8, 2011 issued in PCT counterpart application (No. PCT/JP2010/071809).
Official Action dated Jul. 1, 2012 issued in JP counterpart application (No. 2011-514907).

* cited by examiner

US 9,089,908 B2

TIP-REPLACEABLE CUTTING TOOL

CROSS-REFERENCE TO RELATED APPLICATIONS

This application is a continuation-in-part of PCT application No. PCT/JP2010/071809, filed Dec. 6, 2010 and published as WO 2011/071007A1 on Jun. 16, 2011, and which claims priority to Japanese Patent Application No. 2009-278296, filed Dec. 8, 2009. The contents of the aforementioned applications are incorporated by references in their entirety.

BACKGROUND OF THE INVENTION

1. Field of the Invention

The present invention relates to a tip-replaceable cutting tool in which a cutting insert is removably installed, in particular for cutting a configuration part.

2. Description of the Related Art

There is conventionally known a so-called screwed type of cutting tool in which a cutting insert having cutting edges is removably installed to a tool body by using a fastening screw such as a countersunk screw. This type of cutting tool is put into practical use in finish processing to a configuration part of a work piece. An example of the cutting tool used for cutting processing to the configuration part includes a chamfering cutter described in Japanese Patent Laid-Open No. 2005-28502.

This chamfering cutter is structured such that a rhombic plate-shaped cutting insert for chamfering cutter, in which a rhombic face is directed in a cutter rotational direction as a rake face and a cutting edge formed in a ridge portion of the rake face is inclined to be directed to a peripheral side as closer to a rear end side of the cutter body, is removably attached to an insert attachment seat formed in a front end portion of a cutter body.

In the cutting insert for a chamfering cutter, the cutting edges are formed in the ridge portions of the alternate rhombic face sides in a peripheral direction of the cutting insert out of the ridge portions in pairs of the rhombic faces and each peripheral face of the cutting insert connected to the cutting edges is formed as a flank and is inclined to gradually withdraw as it is away from the cutting edge.

In the chamfering cutter described in Japanese Patent Laid-Open No. 2005-28502, the cutting insert is fixed in a predetermined posture to the cutting body when a pair of peripheral faces extending from a sharp corner portion of the rhombic face contact wall faces of the insert attachment seat corresponding to the respective peripheral faces. Here, as viewed from a side opposing the bottom face of the insert attachment seat (or a rake face of the cutting insert), a fastening screw engaging to an inner peripheral face of an attachment hole of the cutting insert is deviated slightly closer to the two wall faces than the center of the attachment hole. Therefore the cutting insert is installed such that, by pressing the inner peripheral face of the attachment hole with the fastening screw, the pair of peripheral faces contacts the wall faces of the insert attachment seat corresponding to the respective peripheral faces.

However, at the time of screwing the fastening screw, the cutting insert is subjected to a rotational moment in a rotational direction of the fastening screw by contact between the fastening screw and the inner peripheral face of the attachment hole, and may be forcibly rotated in the rotational direction of the fastening screw in the insert fastening seat. Therefore since the cutting edge of the cutting insert can not be correctly positioned to the cutting body, the precision of a chamfered portion cut by this cutting edge is also deteriorated. Caused by a cutting resistance which the cutting insert receives at cutting processing, the cutting insert is forced to be rotated in a direction opposing the rotational direction. Therefore looseness of the fastening screw is generated, causing further rotation of the cutting insert, and in the worst case there is a possibility that breakage of the cutting edge is generated or the cutting insert falls down from the insert attachment seat.

The present invention is made in view of the foregoing problem, and an object of the present invention is to improve positioning precision of a cutting edge of a cutting insert to a tool body and enhance processing precision in a configuration part of a work piece.

SUMMARY OF THE INVENTION

An embodiment of the present invention has the following construction.

A tip-replaceable cutting tool comprises an insert attachment seat for removably attaching a cutting insert, and a substantially plate-shaped cutting insert installed in the insert attachment seat, wherein the insert attachment seat has a substantially flat bottom face, and first and second restraint wall faces which rise upward from said bottom face and are not in parallel with each other, an angle between the first and second restraint wall faces is smaller than an angle between two peripheral faces of the cutting insert respectively opposing the first and second restraint wall faces, as viewed from a side opposing the bottom face, a lower face of said cutting insert contacts said bottom face and said two peripheral faces contact said first and second restraint wall faces respectively opposing the peripheral faces, one of said two peripheral faces of the cutting insert contacts said first restraint wall face in a substantially parallel posture with an extending direction of said first restraint wall face, and the other peripheral face is inclined relative to an extending direction of said second restraint wall face, and contacts said second restraint wall face at one end portion of said second restraint wall face.

According to this embodiment, the one of the two peripheral faces in the cutting insert contacts the first restraint wall face in a substantially parallel posture with the extending direction of the first restraint wall face. That is, the one of the peripheral faces makes line contact or surface contact with the first restraint wall face along the extending direction of the first restraint wall face. The other peripheral face is inclined relative to the extending direction of the second restraint wall face, and contacts the second restraint wall face at one end portion of the second restraint wall face. That is, the other peripheral face makes point contact or line contact with the second restraint wall face at one end portion of the second restraint wall face. In the cutting insert attached in the insert attachment seat, the one peripheral face is thus restrained in a state in parallel with the extending direction of the first restraint wall face, and therefore the attachment precision and the attachment stability of the cutting insert to the insert attachment seat are improved. Thereby the positioning precision of the cutting edge for cutting the configuration part to the tool body and the processing precision of the configuration part are improved.

According to the present invention, the attachment precision and the attachment stability of the cutting insert are improved. The positioning precision of the cutting edge of the cutting insert to the tool body and the processing precision of the configuration part cut by the cutting edge are improved.

Further features of the present invention will become apparent from the following description of exemplary embodiments (with reference to the attached drawings).

DESCRIPTION OF THE EMBODIMENTS

Hereinafter, a chamfering cutter of an embodiment of the present invention will be described with reference to the drawings.

Figure 1:
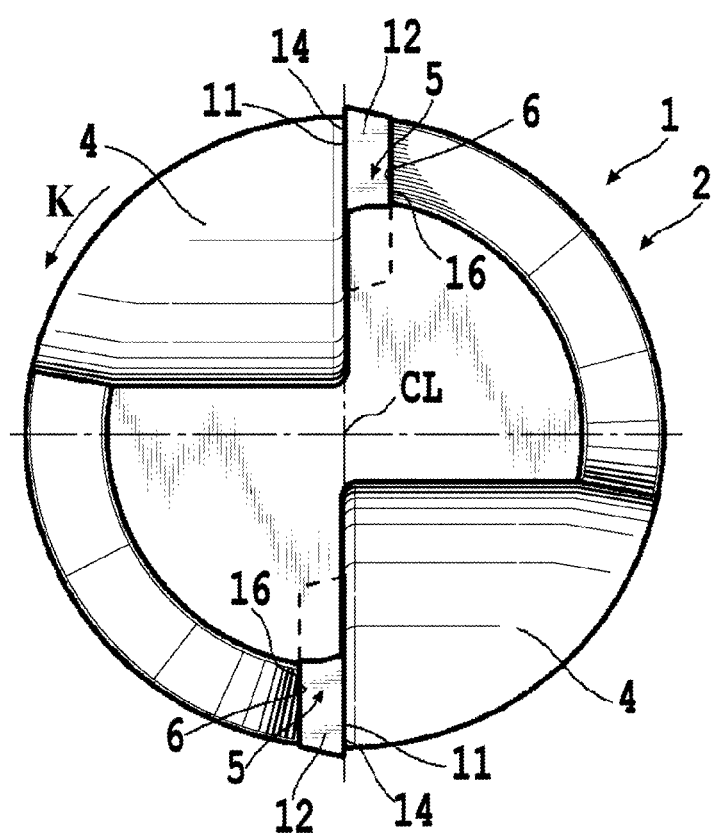
FIG. 1 is a front view showing a chamfering cutter as viewed from a front end side thereof according to an embodiment of the present invention.
Figure 2:
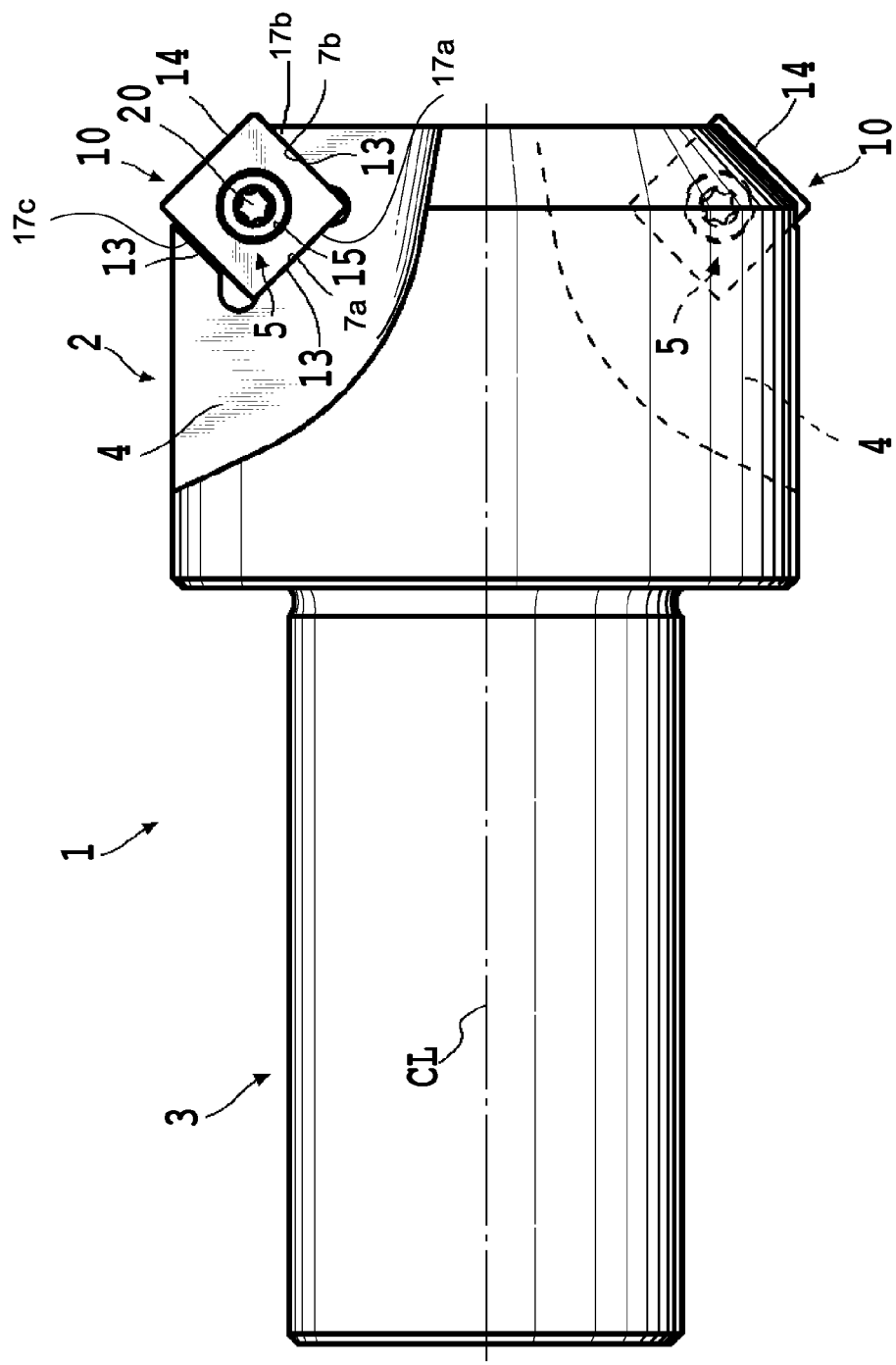
FIG. 2 is a left side view showing the chamfering cutter shown in FIG. 1.
Figure 3:
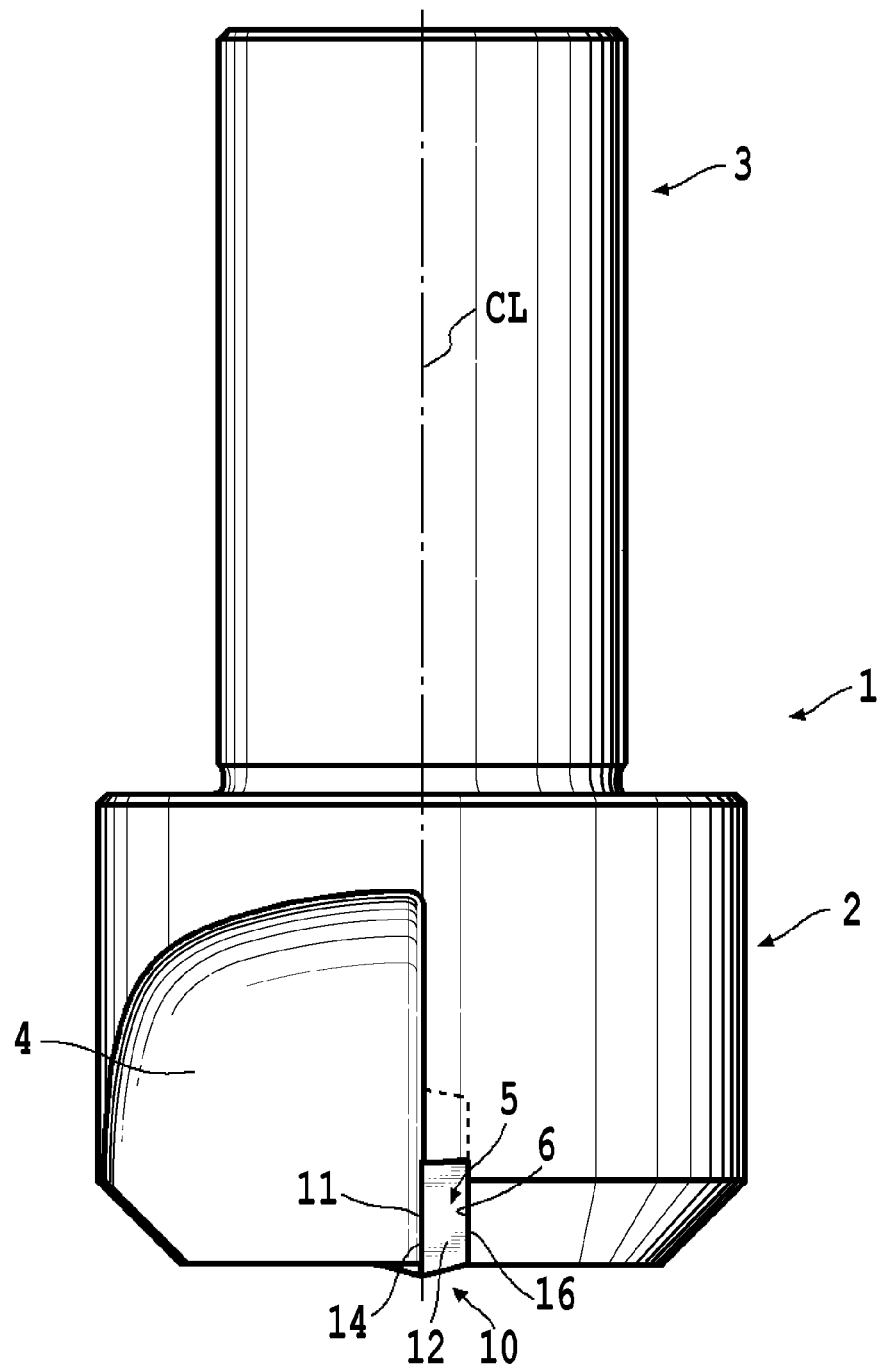
FIG. 3 is a plan view showing the chamfering cutter shown in FIG. 1.

As shown in FIG. 1 to FIG. 3, a chamfering cutter of the present embodiment is structured such that a cutting insert 10 having cutting edges 13 is removably installed in an insert attachment seat 5 formed in a front end peripheral portion of a tool body 1. The tool body 1 is formed in a substantially cylindrical shape to rotate around a center axis line CL. A shank 3 is formed in a rear end side (left side in FIG. 2) for installing the tool body 1 in a machine tool such as a machining center, and a cutting head 2 in which the insert attachment seat 5 is provided is formed in a front end side (right side in FIG. 2) of the tool body 1.

Figure 4:
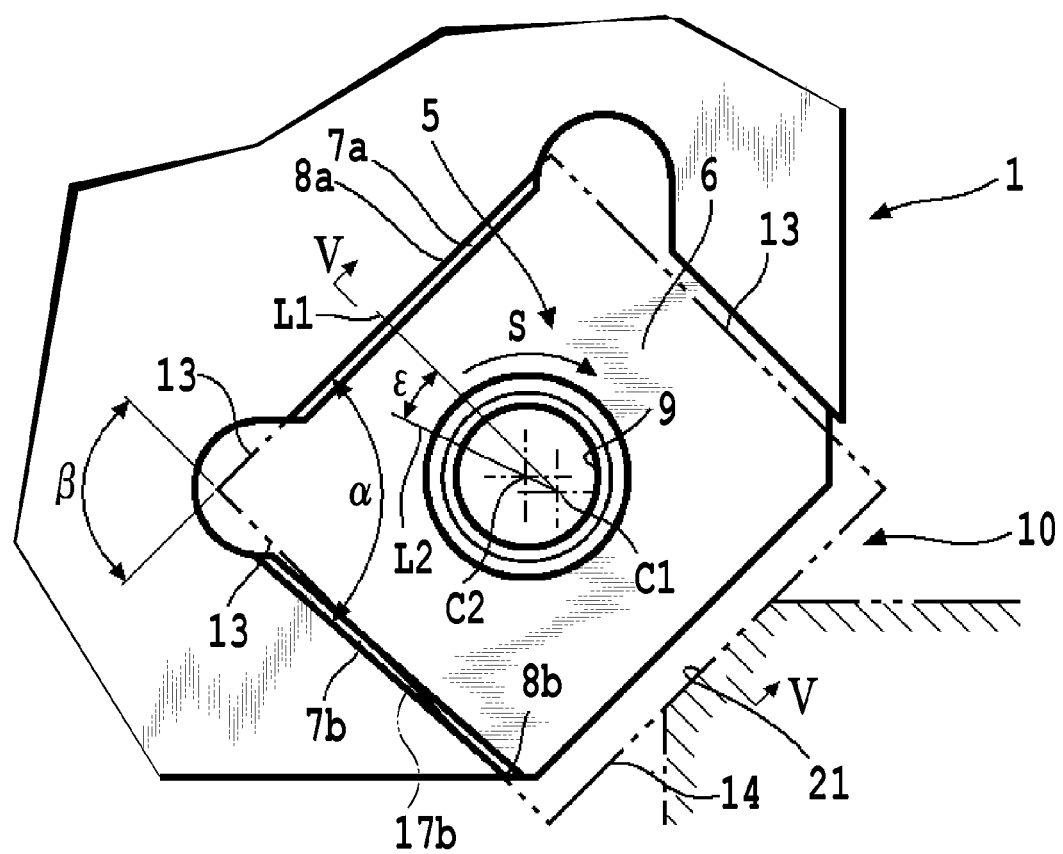
FIG. 4 is a front view showing an insert attachment seat of the chamfering cutter shown in FIG. 1.
Figure 5:
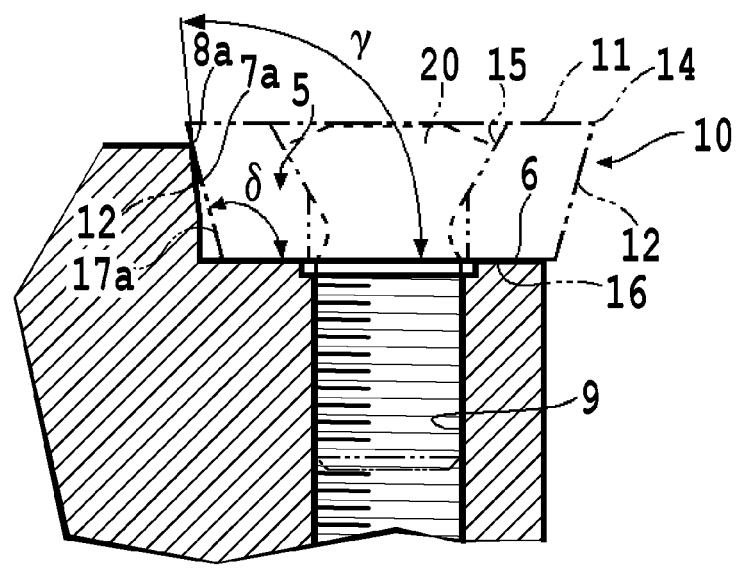
FIG. 5 is an end view taken along line V-V in FIG. 4.

Chip pockets 4 are formed on a peripheral surface of the cutting head by notching it in such a manner as to extend from a front end face toward a rear end face of the cutting head 2. The insert attachment seat 5 is formed on the wall face of the chip pocket 4 facing a cutter rotational direction K, and is recessed into the wall face. As shown in FIG. 4 and FIG. 5, the insert attachment seat 5 is provided with a substantially flat bottom face 6 and at least two restraint wall faces rising upward from the bottom face 6, that is, first and second restraint wall faces 7a and 7b. In the present embodiment, an extending direction of the first restraint wall face 7a to a reference plane perpendicular to the center axis line CL of the tool body 1 is in agreement with a desired chamfering angle. That is, in a case of aiming at a chamfer of 45°, the first restraint wall face 7a is formed to be inclined by 45° to the reference plane. The bottom face 6 is formed with a substantially flat face, and opposes and contacts a seating face 16 of the cutting insert 10. A female screw hole 9 is formed in a substantially central portion of the bottom face 6. As shown in FIG. 4, the first and second restraint wall faces 7a and 7b rise from the bottom face 6, that is, in a direction substantially perpendicular thereto and establish a predetermined angle therebetween. The first and second restraint wall faces 7a and 7b respectively contact opposing first and second peripheral faces 17a or 17b of the cutting insert 10. As seen in FIGS. 2 and 4, the cutting insert also has a third peripheral face 17c on the opposite side of the insert from second peripheral face 17b. Third peripheral face opposes, but need not contact, yet another wall face of the insert attachment seat 5.

Figure 6:
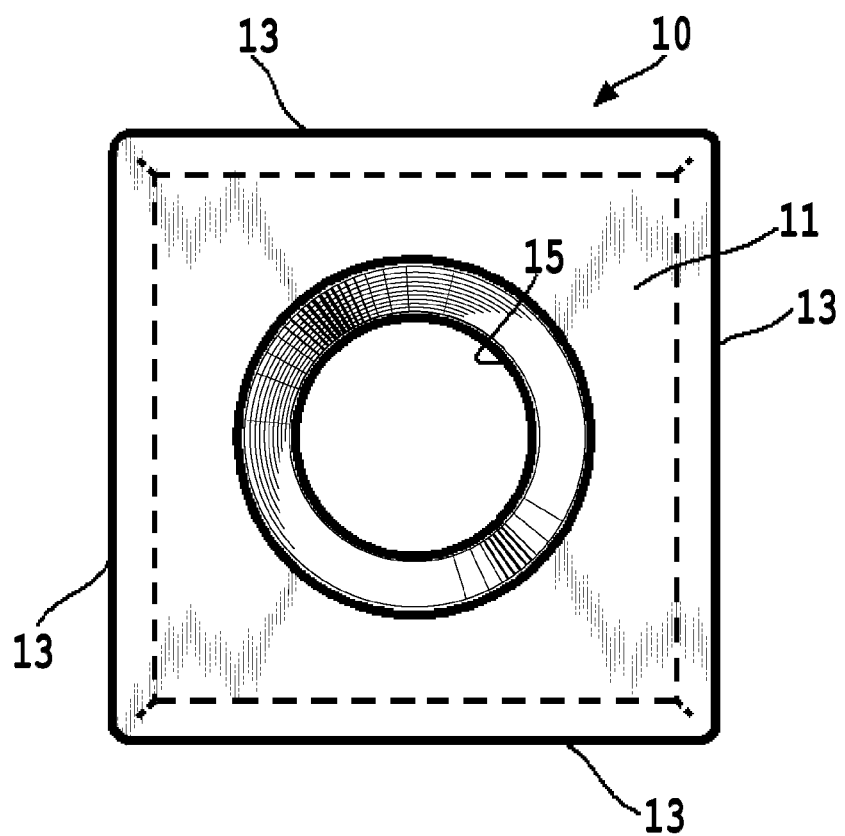
FIG. 6 is a front view showing a cutting insert installed in the chamfering cutter shown in FIG. 1.
Figure 7:
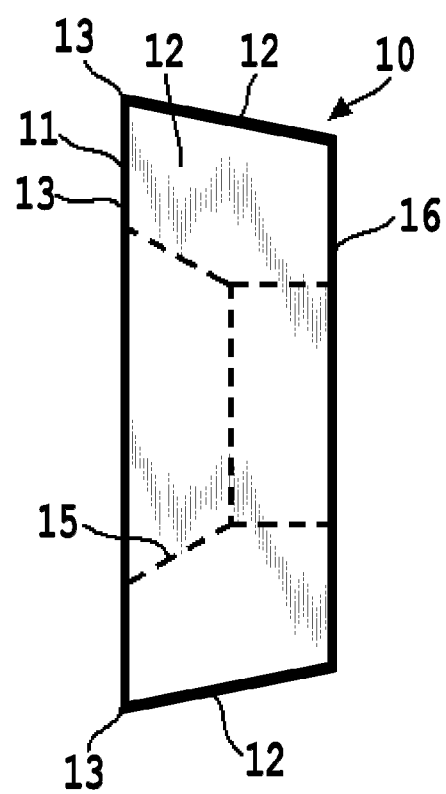
FIG. 7 is a right side view showing the cutting insert shown in FIG. 6.
Figure 8:
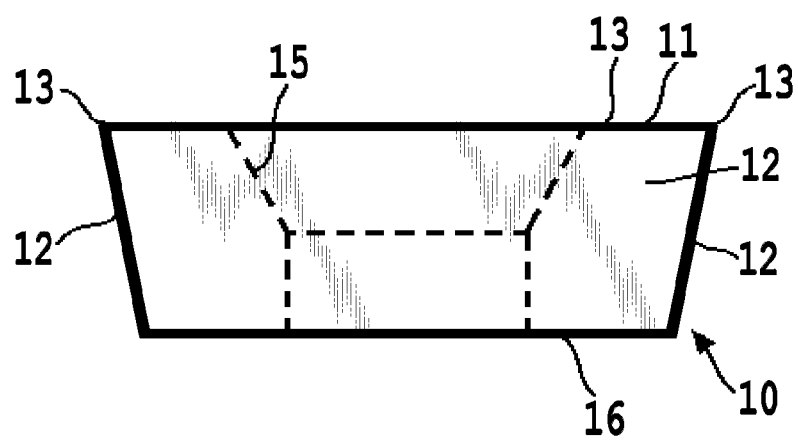
FIG. 8 is a bottom view showing the cutting insert shown in FIG. 6.

As shown in FIG. 6 to FIG. 8, the cutting insert 10 is formed in a substantially square plate shape and includes a rake face 11 formed in at least one of square faces as upper and lower faces of the cutting insert 10, a seating face 16 formed in the square face opposing the square face as the rake face 11, flanks 12 formed in peripheral faces extending between a pair of square faces as the rake face 11 and the seating face 16, cutting edges 13 formed in intersecting ridge portions of the rake face 11 and the flank 12, and an attachment hole 15 penetrating through the central portion of the square face in the thickness direction.

The present cutting insert 10 exemplifies a positive type in which the square face as the rake face 11 is intersected in a sharp angle to the peripheral face as the flank 12 to have a positive flank angle, but may be of a negative type in which the rake face 11 is intersected perpendicularly to the flank 12 to have a flank angle of 0°. In the present embodiment, the flank angle of the flank 12 of the cutting insert 10 is set to 11°. In a case of a cutting insert of the negative type, opposing square faces are selectively used as the rake face 11, thereby making it possible to use both the faces. In the present embodiment, the rake face 11 is formed with a substantially flat square face, but, not limited thereto, may include an inclined face of which a section connecting to the cutting edge 13 is inclined relative to the square face. In this case, a positive or negative rake angle is provided by the inclined face.

A section of the cutting insert 10 forming part of at least the cutting edge 13 is made of hard material such as cemented carbide, coated cemented carbide, cermet, ceramic, or ultra high pressure sintered compact containing diamond or cubic boron nitride.

Upon placing the cutting insert 10 on the insert attachment seat 5, the seating face 16 of the cutting insert 10 contacts the bottom face 6 of the insert attachment seat. Further, the two adjacent peripheral faces 17a and 17b not involved in cutting, out of the four peripheral faces provided in the cutting insert 10, respectively contact the adjacent first or second restraint wall face 7a or 7b of the insert attachment seat 5. Upon fixing the cutting insert 10 on the insert attachment seat 5, a fastening screw 20 having a head capable of engaging the inner wall face of the attachment hole 15 is inserted into the attachment hole 15 of the cutting insert 10 to be screwed into the female screw hole 9 formed in the bottom face 6 of the insert attachment seat 5. Thereby the head of the fastening screw 20 presses the inner wall face of the attachment hole 15 toward the bottom face 6 and the first and second restraint wall faces 7a and 7b of the insert attachment seat 5, so that the cutting insert 10 is removably attached to the insert attachment seat 5. An operative cutting edge 13 arranged in the front end peripheral side of the tool body 1 of the attached cutting insert 10 forms a main cutting edge 14 for cutting a chamfered portion of a work piece.

In FIG. 4, as viewed from a side opposing the bottom face 6 of the insert attachment seat, an angle α between the first and second adjacent restraint wall faces 7a and 7b is slightly smaller than an angle β between the two adjacent peripheral faces 17a and 17b of the cutting insert 10 contacting the first and second adjacent restraint wall faces 7a and 7b. In the present embodiment, the angle β between the two peripheral faces is 90°, and the angle α between the first and second restraint wall faces is 89.5°.

In FIG. 5, as viewed in a cross section perpendicular to an extending direction of the first restraint wall face 7a, an angle γ between the first restraint wall face 7a and the bottom face 6 in the present embodiment is an obtuse angle. In addition, the angle γ is smaller by the order of 0.5° than an angle δ between the first peripheral face 17a of the cutting insert contacting the first restraint wall face 7a and the seating face 16 of the cutting insert. Therefore the two peripheral faces 17a do not make surface contact with the first restraint wall face 7a and substantially make line contact with an upper end portion 8a of the first restraint wall face 7a in the remotest position in a direction rising (upward) from the bottom face 6.

In the present embodiment, an angle between the second restraint wall face 7b and the bottom face 6 is likewise γ, and is smaller by the order of 0.5° than the angle δ between the second peripheral face 17b and the seating face 16 of the cutting insert 6.

In the insert attachment seat 5, the cutting insert 10 receives a rotational moment in the same direction with the screwing rotational direction S of the fastening screw 20 by contact between the inner wall face of the attachment hole 15 and the head of the fastening screw 20. Within the insert attachment seat 5, the first restraint wall face 7a is positioned rotationally forward of the second restraint wall face 7b in a screwing rotational direction S of the fastening screw 20. The cutting insert 10 is pressed toward the first restraint wall face 7a by the head of the fastening screw 20. Therefore the first peripheral face 17a of the cutting insert 10 opposing the first restraint wall face 7a makes line contact with the upper end portion 8a of the first restraint wall face 7a substantially over an entire length in the extending direction of the first restraint wall face 7a, to be supported and restrained thereon. That is, the first peripheral face 17a is reliably supported and restrained in parallel with the extending direction of the first restraint wall face 7a. On the other hand, since the angle α between the first and second restraint wall faces 7a and 7b is smaller than the angle β between the first and second peripheral faces 17a and 17b of the cutting insert 10, an extending direction of the other peripheral face 17b of the cutting insert 10 is inclined to an extending direction of the second restraint wall face 7b opposing the peripheral face 17b. Therefore the peripheral face 17b of the cutting insert 10 is supported and restrained substantially in a point contact state with an end portion 8b which is a part of the second restraint wall face 7b and is positioned rotationally rearward in the screwing rotational direction S. Accordingly, as viewed from a side opposing the bottom face 6 of the insert attachment seat, in the cutting insert 10, the main cutting edge 14 in a position opposing the first peripheral face 17a making line contact with the first restraint wall face 7a has an inclination equal to that of the chamfered portion 21 of a work piece.

As viewed from a side opposing the bottom face 6 of the insert attachment seat, a center point C2 of the female screw hole 9 formed in the bottom face 6 is offset from a center C1 of the attachment hole 15 when the cutting insert is positioned on the insert attachment seat. Center point C2 is closer to both the first and second restraint wall faces 7a and 7b than the center C1 of the attachment hole 15. In the present embodiment, as shown in FIG. 4, the center point C2 of the female screw hole 9 is slightly closer to the first and second restraint wall faces 7a and 7b and is located along a virtual straight line L2 inclined at an angle ε, which is larger than 0° and smaller than ½ of the angle α formed between the first and second restraint wall faces, in a side of the second restraint wall face 7b, to a virtual straight line L1 passing through the center C1 of the attachment hole 15 and perpendicular to the first restraint wall face 7a. The center point C2 of the female screw hole 9 is not equally offset from center C1 with respect to the first and second restraint wall faces 7a and 7b. Center point C2 is offset to be closer to the side of the first restraint wall face 7a than to the second restraint wall face 7b. The cutting insert 10 engaged to the head of the fastening screw 20 (which is threaded into the female screw hole 9) is therefore also biased to be closer to the first and second restraint wall faces 7a and 7b, and in particular to the first restraint wall face 7a.

The main cutting edge 14 of the cutting insert 10 attached to the chamfering cutter according to the present embodiment has, as shown in FIG. 1 and FIG. 3, an axial rake angle and a radial rake angle each of which is set to 0°.

The chamfering cutter described above is rotated around the center axis line CL of the tool body 1 and is fed along the chamfered portion 21 of a work piece, thereby cutting the chamfered portion with the main cutting edge 14.

The main cutting edge 14 cuts the work piece to form the chamfered portion. Therefore, the positioning precision of the main cutting edge 14 to the tool body 1 of the chamfering cutter has a great impact on processing precision of the chamfered portion.

Hereinafter, an operational effect of the chamfering cutter of the present embodiment will be explained. The first peripheral face 17a of the cutting insert 10, which cutting insert is pressed toward the first and second restraint wall faces 7a and 7b of the insert attachment seat 5 by the fastening screw 20, contacts the upper end portion 8a of the first restraint wall face 7a along a line which extends over an entire length of the first restraint wall face 7a. That is, the first peripheral face 17a is supported and restrained in a state in parallel with the extending direction of the first restraint wall face 7a.

Here, as described above, the angle α between the first and second restraint wall faces 7a and 7b is slightly smaller than the angle β between the two peripheral faces 17a and 17b of the cutting insert 10. Therefore the second peripheral face 17b of the cutting insert 10 opposes the second restraint wall face 7b, is inclined relative to the extending direction of the second restraint wall face 7b, and is supported and restrained substantially in a point contact state with an end portion 8b of the second restraint wall face 7b, at a point that is remote from the first restraint wall face 7a and proximate to the open periphery of the insert attachment seat 5. In this manner, the first peripheral face 17a makes line contact with the substantially entire length of the upper end portion 8a of the first restraint wall face 7a along the extending direction of the first restraint wall face 7a, and on the other hand, the second peripheral face 17b makes point contact with the end portion 8b of the second restraint wall face 7b at a location remote from the first restraint wall face 7a. Thereby, since support and restraint of the cutting insert by the first and second restraint wall faces 7a and 7b become stable and the first peripheral face 17a is positioned to be in parallel with the extending direction of the first restraint wall face 7a, the attachment precision and attachment stability of the cutting insert 10 to the insert attachment seat 5 are improved. As viewed from a side opposing the bottom face 6 of the insert attachment seat, the cutting insert 10 is attached to have an inclination equal to that of the chamfered portion 21 expected to be cut by the main cutting edge 14, which is on the opposite side of the cutting insert from the first peripheral face 17a Therefore the processing precision of the chamfered portion 21 cut by the main cutting edge 14 is extremely high.

In the present embodiment, the cutting insert 10 is biased by the fastening screw 20 to be closer to the first and second restraint wall faces 7a and 7b, and particularly biased towards the first restraint wall face 7a. Therefore the cutting insert 10 is pressed more strongly to the first restraint wall face 7a than to the second restraint wall face 7b. Thereby the line contact between the first peripheral face 17a of the cutting insert 10 and the upper end portion 8a of the first restraint wall face 7a becomes stronger, and the first peripheral face 17a is supported and restrained more strongly in a parallel state with the extending direction of the upper end portion 8a of the first restraint wall face 7a. Further, since the first peripheral face 17a is supported and restrained in a parallel state with the extending direction of the upper end portion 8a of the first restraint wall face 7a against the rotational moment applied by fastening screw 20 on the cutting insert 10 in the screwing rotational direction S, the cutting insert 10 can be reliably prevented from moving in the screwing rotational direction S along with rotation of the fastening screw 20. As a consequence, the fastening screw 20 does not become loose and the attachment stability of the cutting insert 10 and the processing precision of the chamfered portion can be maintained for a long time.

The two peripheral faces 17a and 17b of the cutting insert 10 do not contact the first and second restraint wall faces 7a and 7b over a surface (only over a line or point), and contact the upper end portions of the restraint wall faces 7a and 7b which are the remotest in a direction rising (upward) from the bottom face 6 of the insert attachment seat 5. Thereby, since the contact state between the first and second restraint wall faces 7a and 7b and the first and second peripheral faces 17a and 17b is more stable, the positioning precision of the cutting insert 10 is further improved and the processing precision of the chamfered portion is extremely high.

The main cutting edge 14 of the cutting insert 10 attached to the chamfering cutter has the axial rake angle and the radial rake angle each of which is set to 0°. In this case, as shown in FIG. 2, the angle between the center axis line CL in the tool body 1 and the main cutting edge 14 in a side view of the chamfering cutter is in agreement with the angle between the center axis line CL at rotation of the chamfered cutter around the center axis line CL and the rotational trace of the main cutting edge 14. That is, a configuration of the main cutting edge 14 in the cutting insert 10 in a side view is transferred on the chamfered portion 21 of a work piece. Accordingly, an inclination angle of the first restraint wall face 7a of the insert attachment seat 5 may be formed to be in agreement with an inclination angle equal to that of the chamfered portion expected to be cut, by use of the center axis line CL as a reference in a side view. When the first restraint wall face 7a is thus formed to have an inclination angle equal to that of the chamfered portion expected to be cut, the forming of the first restraint wall face 7a is easy and the precision of the formed first restraint wall face 7a is high. Further, since the inclination angle of the formed first restraint wall face 7a can be measured by direct comparison with the inclination angle of the chamfered portion 21 expected to be cut, the measurement is easy and the measurement precision is high. On the other hand, also in regard to the cutting insert 10, since the main cutting edge 14 can be formed in parallel with the peripheral face 17a contacting the first restraint wall face 7a, the forming of the main cutting edge 14 is easy and the precision of the formed main cutting edge 14 is high. By the above construction, the positioning precision of the main cutting edge 14 to the tool body 1 is extremely high.

The present invention is not limited to the explained embodiment, and modifications, elimination, and addition of the construction are possible as needed without mentioning.

The present invention is not limited to the chamfering cutter, and may be applied to a tip-replaceable bite, end mill, cutter and the like used for processing the configuration part of a work piece. The screwing direction S of the fastening screw 20 is generally the right rotation, but may be the left rotation depending on the construction or the arrangement of the first and second restraint wall faces 7a and 7b. The configuration of the cutting insert 10 is not limited to the substantially square plate shape, and may be a polygonal plate shape such as quadrangle, triangle, pentagon, and the like. Also, present invention is not limited to the structure where only the upper end portions 8a of the two restraint wall faces 7a and 7b in the insert attachment seat 10 contact the first and second peripheral faces 17a and 17b of the cutting insert 10. Instead, the entire restraint wall faces 7a and 7b may contact the first and second peripheral faces 17a and 17b, or sections of the restraint wall faces 7a and 7b other than the upper end portion may contact the first and second peripheral faces of the cutting insert in a limited manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A tip-replaceable cutting tool comprising:
   an insert attachment seat for removably attaching a cutting insert; and
   a cutting insert installed in the insert attachment seat and having an operative cutting edge, the cutting insert having an upper face, a lower face and a plurality of peripheral faces extending between the upper and lower faces, wherein
   said insert attachment seat has a substantially flat bottom face, a female screw hole into which a fastening screw is threaded for attaching the cutting insert, and first and second restraint wall faces which rise upward from said bottom face and are not in parallel with each other, the second restraint wall face being between the operative cutting edge and the first restraint wall face, in a screwing rotational direction of the fastening screw,
   a first angle between the first and second restraint wall faces is smaller than a second angle between two peripheral faces of the cutting insert respectively facing the first and second restraint wall faces, as viewed from a side opposing the bottom face,
   the lower face of said cutting insert contacts said bottom face and said two peripheral faces of the cutting insert contact said first and second restraint wall faces,
   a first of said two peripheral faces of the cutting insert makes line contact with said first restraint wall face in an extending direction of said first restraint wall face, and
   a second of said two peripheral faces is inclined relative to an extending direction of said second restraint wall face, and contacts said second restraint wall face at an end portion of said second restraint wall face.

2. A tip-replaceable cutting tool according to claim 1, wherein
   said cutting insert has an attachment hole formed to penetrate a central portion thereof in a thickness direction, and
   as viewed from a side opposing the bottom face of said insert attachment seat:
   a first line (L1) perpendicular to the first restraint wall face passes through a center C1) of said attachment hole of the cutting insert,
   a center point (C2) of said female screw hole is positioned on a second line (L2) which passes through the center (C1) and forms a third angle with the first line (L1), the third angle ϵ being larger than 0° and less than ½ of the first angle, and the center point (C2) is closer to the second restraint wall face than the center (C1).

3. A tip-replaceable cutting tool according to claim 1, wherein said two peripheral faces of the cutting insert contact upper end portions of the first and second restraint walls, away from the bottom face of the insert attachment seat.

4. A tip-replaceable cutting tool according to claim 1, wherein a cutting edge formed at least in a ridge portion of an upper face of said cutting insert for cutting a configuration part of a work piece has an axial rake angle and a radial rake angle each of which is set to 0° when the cutting insert is attached to a tool body.

5. A tip-replaceable cutting tool according to claim 1, wherein comprising:

said cutting insert has an attachment hole penetrating a central portion thereof in a thickness direction;

said insert attachment seat includes a female screw hole for receiving a fastening screw to attach the cutting insert, the female screw hole having a center point (C2), and as viewed from a side opposing the bottom face of said insert attachment seat:

the center point (C2) of said female screw hole is offset from a center (C1) of said attachment hole when the cutting insert is placed on said insert attachment seat;

said center point (C2) is closer to both the first restraint wall and the second restraint wall than the center (C1) is to either restraint wall;

a first line (L1) perpendicular to the first restraint wall face passes through the center (C1), and the center point (C2) is positioned on a second line (L2) which passes through the center (C1) and forms a third angle with the first line (L1), the third angle ϵ being larger than 0° and less than ½ of the first angle.

\* \* \* \* \*